Oct. 29, 1963     C. A. PURDY     3,108,501
DRILL FIXTURE

Filed April 3, 1961     3 Sheets-Sheet 1

INVENTOR.
CHESTER A. PURDY
BY
Attorneys

Oct. 29, 1963 C. A. PURDY 3,108,501
DRILL FIXTURE
Filed April 3, 1961 3 Sheets-Sheet 3

INVENTOR.
CHESTER A. PURDY
BY
Attorneys

United States Patent Office 3,108,501
Patented Oct. 29, 1963

3,108,501
DRILL FIXTURE
Chester A. Purdy, Belmont, Wis., assignor to Ransburgh Electro-Coating Corp., Indianapolis, Ind., a corporation of Indiana
Filed Apr. 3, 1961, Ser. No. 100,069
9 Claims. (Cl. 77—63)

This invention relates to a drill fixture, and more particularly to a drill fixture for adjustably positioning a workpiece with respect to a drill for performing a series of work steps on said workpiece.

It is an object of this invention to provide a drill fixture which can be used in combination with a conventional drill head and drill stage, and which can be easily mounted on said drill stage. It is a further object of the invention to provide a drill fixture which will provide an accurate axial alignment between a workpiece and a drill, which will locate a workpiece in any desired position of adjustment with respect to the axis of said drill, and which can be simply and quickly manipulated to locate a workpiece in any such position of adjustment.

It is a specific object of this invention to provide a drill fixture for the air cap of an air-atomizing electrostatic spray gun, which will permit a plurality of openings to be drilled in said air cap in precise locations with respect to the axis of said air cap.

The air caps employed in air-atomizing electrostatic spray guns may have pluralities of openings for the reception of charging electrodes and coating-feeding means. Such air caps may also have other openings for the discharge of air, with the air discharged through said other openings atomizing the coating material into a spray and shaping the configuration of said spray. In order to insure the development of a uniform spray, and a spray which will be directed from the gun in the desired shape, it is necessary that all of the cap openings be accurately located in predetermined positions disposed about the axis of the air cap. My invention contemplates a drill fixture for an air cap blank which will locate said blank in any desired positions of adjustment with respect to a drill to permit openings and/or recesses to be drilled or otherwise formed in the blank in an accurately located pattern.

In accordance with the preferred form of my invention, I provide a drill fixture which is adapted to be used in combination with a conventional drill assembly having a drill head and drill stage movable with respect to each other. My fixture comprises a supporting structure carrying a workpiece holder. The workpiece holder comprises a cradle rotatably carried on said supporting structure for adjusting the angular position of tilt of a workpiece with respect to the axis of a drill mounted in the drill head. The workpiece is releasably mounted in a nest carried in the cradle and rotatable with respect to said cradle for adjusting the angular orientation of the workpiece about its axis to thus adjust the angular orientation of the workpiece with respect to the axis of the drill irrespective of the angle of tilt between the workpiece and drill. Conveniently, I provide locating means releasably mountable on the nest to engage the workpiece and axially align it with the workpiece holder.

Other objects and features of my invention will become apparent from the more detailed description which follows and from the accompanying drawings, in which.

Figure 8:
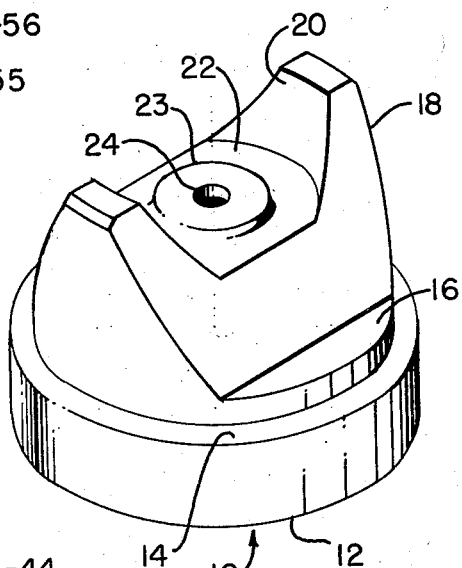
FIG. 8 is an isomeric view of a workpiece blank adapted to be used with the fixture shown in FIG. 1.
Figure 7:
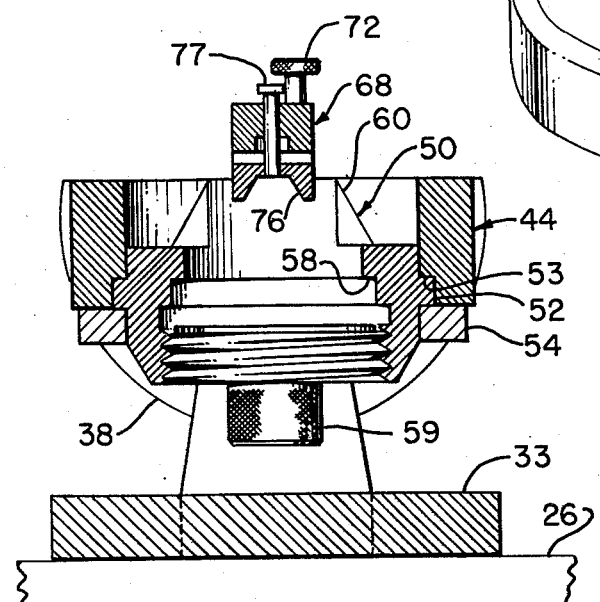
FIG. 7 is a vertical section taken on the line 7—7 of FIG. 5.

The illustrated embodiment of my invention is adapted to support a blank of an air cap for an air-atomizing electrostatic spray gun in a plurality of positions of adjustment with respect to a drill for drilling a plurality of openings and/or recesses in said blank at precise, symmetrical locations about the axis of said blank. As shown in FIG. 8, the blank 10 comprises a circular base 12 having a shoulder 14 extending inwardly from its circumference, with the inner edge of the shoulder 14 terminating at the base of a raised platform 16. A pair of horns 18 project upwardly from the opposite ends of the platform 16 and are provided with arcuate inclined inner faces 20, whose lower edges terminate in a plane surface 22 having a raised disk 23 at its center. An opening 24 is formed on the axis of the disk 23 and extends through the blank 10.

In order to permit such an air cap to be employed in an air-atomizing electrostatic spray gun, it is necessary that a plurality of openings be formed in the air cap at accurately located positions symmetrically oriented about the axis of the opening 24. Such openings may be at various radial and angular positions with respect to the axis of the opening 24. However, since the air cap itself does not constitute a part of this invention, it is not necessary to discuss the locations of such openings in the air cap.

Figure 1:
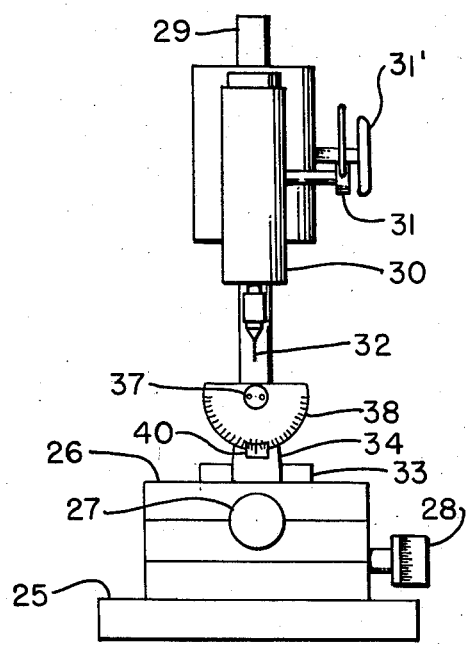
FIG. 1 is a front elevation of a drill assembly with a drill fixture embodying my invention mounted thereon.
Figure 2:
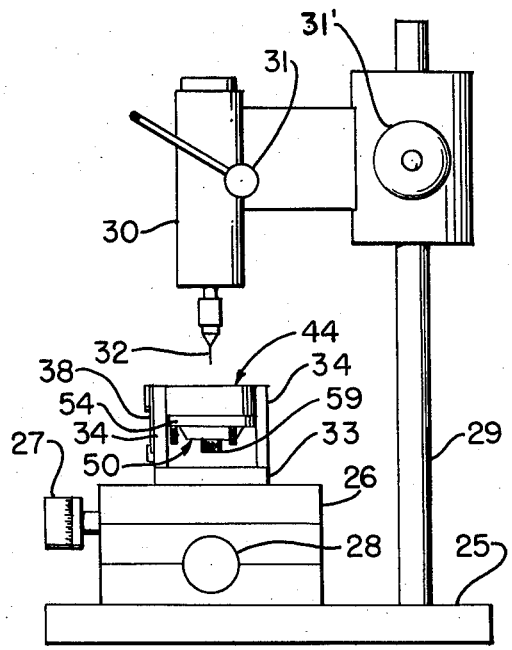
FIG. 2 is a side elevation of the drill assembly and drill fixture shown in FIG. 1.
Figure 3:
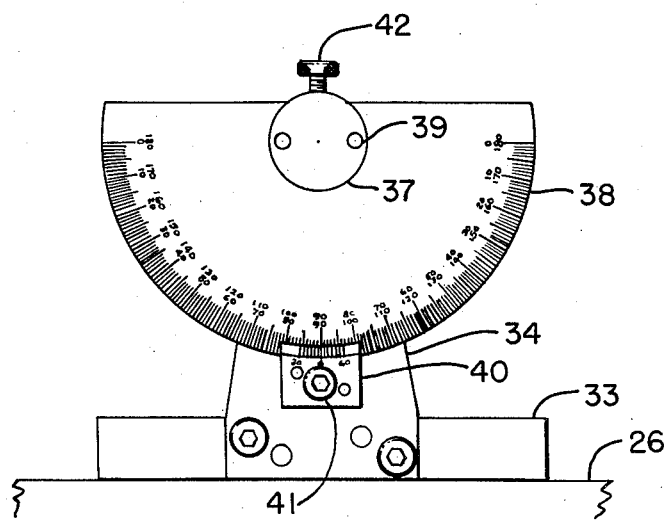
FIG. 3 is an enlarged front elevation of the drill fixture shown in FIG. 1.
Figure 4:
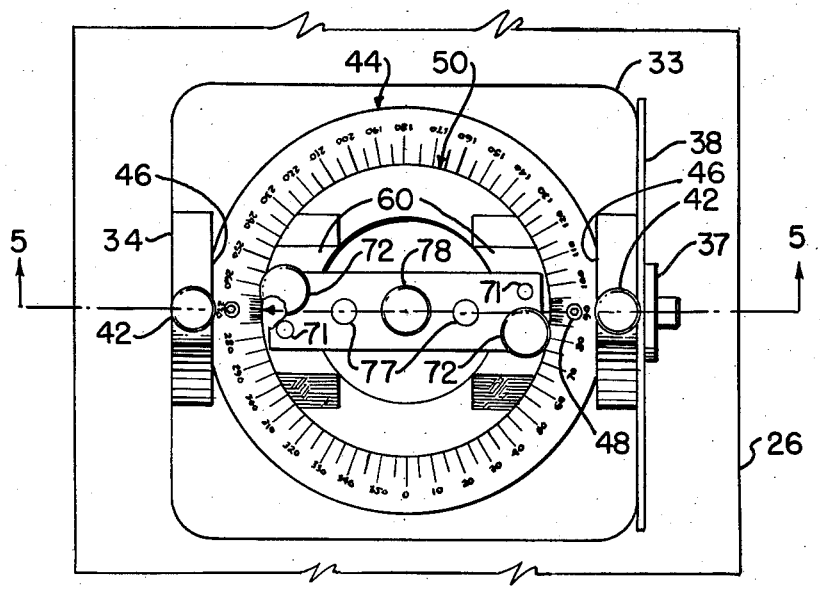
FIG. 4 is a plan view of the drill fixture shown in FIG. 3, but showing said fixture with a workpiece locator mounted thereon.

The specific embodiment of my invention illustrated in the drawings is adapted to dispose an air cap blank 10 in various positions of adjustment with respect to a drill to form the desired openings in such air cap. As shown in FIGS. 1 and 2, my drill fixture may be used in association with a conventional drill assembly, including a base 25 supporting a compound stage 26 movable measured distances fore and aft, as by an adjusting screw 27, and movable measured distances laterally, as by an adjusting screw 28. A post 29 is mounted on the base 25 and supports a drill head 30 vertically movable with respect to the stage 26, as by adjusting members 31 and 31′ for bringing its drill 32 into engagement with a workpiece.

The illustrated embodiment of my drill fixture is adapted to be mounted on the upper face of the compound stage 26, and comprises a platform 33 mountable on said stage for movement therewith. A pair of upwardly extending supports 34 are rigidly mounted on the platform 33, and are provided at their upper ends with aligned openings for the reception of bearings 35 in which a pair of trunnions 36 and 37 are journaled for rotatably supporting a workpiece holder in an elevated position above the platform 33.

As shown, the trunnions 36 and 37 permit the workpiece holder, and thus a workpiece carried therein, to be angularly tilted with respect to the plane of the stage 26 about an axis of rotation parallel to said stage. The amount of such angular tilting is conveniently measured by a semicircular gauge plate 38 pinned, as at 39, to the trunnion 37 for movement therewith. The circumference of the gauge plate 38 is scaled in degrees, or other units of angular measurement, and a pointer plate 40 is rigidly mounted on the support 34 adjacent the gauge plate 38, as by screw 41, so that upon rotation of the workpiece holder about the common axis of the trunnions 36 and 37, the pointer plate 40 will read directly on the scale of the gauge plate 38 to determine the angular positioning of the workpiece holder with respect to the drill stage 26 and the axis of the drill 32. Conveniently, tapped openings are formed in the supports 34 adjacent their upper ends for the reception of set screws 42 extending through openings in the bearings 35 for engagement with the trunnions 36 and 37 to releasably retain the workpiece holder in the desired adjusted angle of tilt.

Figure 5:
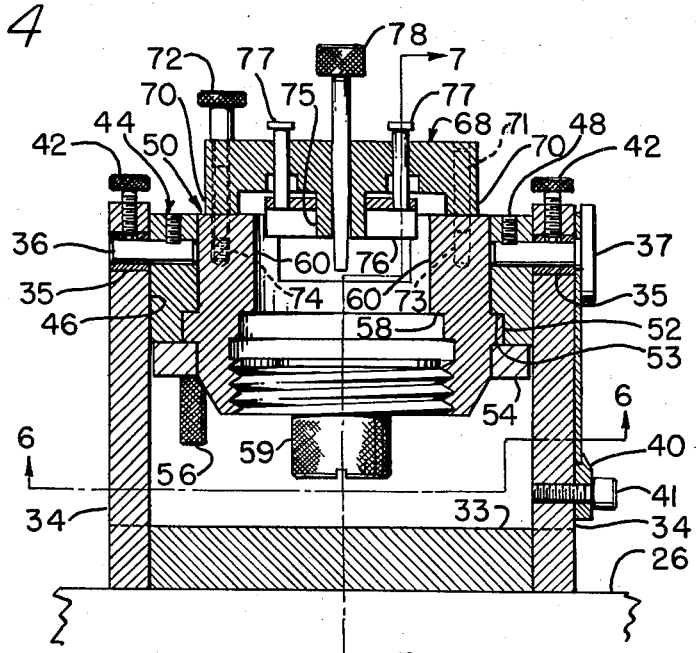
FIG. 5 is a vertical section taken on the line 5—5 of FIG. 4.

As shown in FIG. 5, the workpiece holder comprises a cradle 44 and a nest 50 carried in said cradle. The cradle 44 has a generally cylindrical shape, and is provided with a pair of diametrically opposed flat stretches 46 formed along its outer face and swingably carried against the opposed inner faces of the pair of supports 34. Aligned openings are formed in the cradle within the extent of the stretches 46 for the reception of the trunnions 36 and 37, said cradle being fixedly mounted on the trunnions for rotation therewith, as by set screws 48, extending through said cradle and received in recesses formed in the trunnions 36 and 37.

Figure 6:
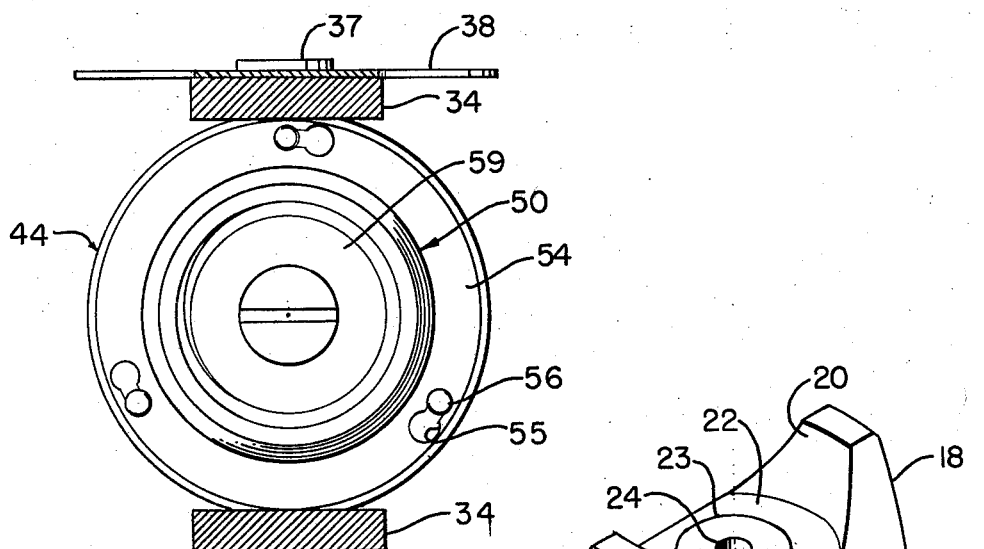
FIG. 6 is a horizontal section taken on the line 6—6 of FIG. 5.

The generally cylindrically shaped nest 50 is carried within the cradle 44 for movement therewith about the axis of rotation of the trunnions 36 and 37. The nest 50 is located axially within the cradle by an annular rib 52 projecting outwardly from the nest and carried against the inner face of the cradle 44. The nest is releasably retained in the cradle adjacent a shoulder 53 formed on said cradle by a ring 54 mounted on the cradle and engaging the lower face of said rib. As shown in FIG. 6, said ring is provided with a series of annularly shaped, keyhole-shaped openings 55 for the reception of screws 56 threadably received in tapped openings formed in the lower face of the cradle.

The nest 50 is adapted to receive an air cap blank 10, and to this end, a shoulder 58 is formed in the generally cylindrical inner face of said nest against which the shoulder 14 on the air cap blank is receivable. The blank 10 is releasably held against said shoulder by a removable nest end cap 59 threadably received in the lower internally threaded end of the nest 50 to bear against the downwardly presented face of said blank. As shown, the nest shoulder 58 is spaced from the common axis of the trunnions 36 and 37 a distance such that the end cap 59 will retain the blank 10 in the nest in a position to dispose the upwardly presented face of the blank disk 23 on the common axis of the trunnions. As shown in FIG. 5, the nest 50 is provided with a pair of opposed arms 60 having end faces disposed coplanar with the upper face of the cradle 44. The nest has an inner diameter slightly larger than the outer diameter of the blank 10 to permit said blank to be moved into a position in the nest with the axis of its opening 24 aligned with the axis of the nest, as will be hereinafter more fully described.

Desirably, the mating surfaces of the cradle and nest are ground and polished to permit said nest to be easily rotated within the cradle about an axis of rotation normal to the axis of rotation of the trunnions 36 and 37. Such rotational movement is conveniently measured by providing a scale in degrees, or other units of angular measurement, on the upper annular face of the cradle 44, and a pointer providing a reference index on the upper face of one of the nest arms 60. Thus, by rotating the nest with respect to the cradle, the angular orientation of a blank 10 carried within said nest can be adjusted with respect to the axis of the drill 32, and by rotating the cradle about the axis of rotation of the trunnions the angle of tilt of said blank can be adjusted with respect to the axis of the drill.

In order for a blank 10 to be symmetrically movable into its positions of adjustment with respect to the axis of the drill 32, the blank opening 24 must be accurately aligned with the axis of the nest. To this end, I provide a locator comprising a bridge 68 having a downwardly projecting leg 70 at each of its ends receivable on the nest arms 60. The legs 70 have diagonally opposed, downwardly projecting locating pins 71 and screws 72, which are received in diagonally opposed untapped and tapped openings 73 and 74 formed in the nest arms 60 for rigidly mounting the locator in axially centered position on said nest. A cylindrical boss 75 formed on the bridge 68 adjacent its center extends through an opening formed in a V-block 76 movably mounted on the underside of the block 68 as by pins 77 extending through the bridge 68 and press-fit in the upper face of said V-block. The V-block 76 has a length such that it will engage the horns 18 on the air cap blank 10, and is grooved to engage the outwardly angling faces of said horns when it is brought in contact therewith. A tapered locating pin 78 is slidably carried in the bridge 68 and its boss 75, and is bindingly receivable in the opening 24 of the air cap blank 10 for accurately aligning the axes of said blank and nest.

The operation of the locator may be described as follows: The locator is mounted on the nest 50 by the screws 72, and a blank 10 is inserted into the nest 50 with its horns 18 loosely seated in the V-block 76 and its axially disposed opening 24 being received on the tapered end of the pin 78. With the locator being fixed to the nest 56, and the blank loosely received in said nest, the blank 10 is moved by means of the pin 78 to accurately align the axis of its opening 24 with the axis of the nest 50. When the blank is thus aligned, the end cap 59 is securely tightened in the nest 50 against the blank 10 to dispose the shoulder 14 on said blank against the nest shoulder, and the locator is then removed from the nest. The blank 10 is thus positioned in the nest with the upper face of its disk 23 lying on the common axis of the trunnions 36 and 37; and with the axis of its opening 24 accurately aligned with the nest axis. In this manner the workpiece holder may be disposed in alignment with the drill, and any rotational movement of the workpiece holder about the axis of the trunnions 36 and 37 to tilt the blank with respect to the axis of the drill, and any rotational movement of the nest 50 within the cradle 44 to adjust the angular orientation of the blank with respect to the axis of the drill 32, will be referenced from a point on the axis of the blank opening 24 at the face of the cap disk 23 to insure the formation of a plurality of openings symmetrically located in the blank.

While my invention has been described for use with the blank of an air cap for electrostatic spray gun, it is to be understood, of course, that my invention may be employed to locate other types of workpieces in positions of adjustment with respect to a drill. To accommodate other types and shapes of workpieces, it is merely necessary to employ a nest 50 which is contoured, or provided with means, for positioning such a workpiece in a fixed orientation within the nest, so that it will be moved with the nest through its angular adjusting movements with respect to the cradle 44 and through the adjustable tilting movements of the cradle about the common axis of the trunnions 36 and 37.

I claim:

1. A drill fixture for adjustably positioning a workpiece with respect to a drill, comprising a supporting structure, a generally cylindrically shaped cradle rotatably carried on said supporting structure on a first axis of rotation, said cradle having an annular shoulder formed in its inner face, an open ended nest carried within said cradle for movement therewith and provided with an outwardly projecting rib interposed between said cradle shoulder and a ring removably mounted on an end face of said cradle, said ring rotatably supporting the nest in said cradle for movement about a second axis of rotational normal to said first axis of rotation, and means removably mounted on one end of said nest for releasably retaining a workpiece in a fixed position against means formed in said nest for movement of said workpiece with said nest for adjusting the angle of tilt of said workpiece with respect to said drill about said first axis of rotation and the angular orientation of said workpiece with respect to the axis of said drill about said second axis of rotation.

2. A drill fixture for adjustably positioning a workpiece with respect to a drill, comprising a platform, a pair of supports projecting upwardly from said platform, a cradle mounted on said supports and rotatable about a first axis of rotation parallel to said platform, a generally cylindrically shaped open ended nest carried in said cradle for movement therewith and rotatable with respect to said nest about a second axis of rotation normal to said first axis of rotation, shoulder means formed in the inner side face of said nest, an end cap threadably received in one end of said nest and adapted to bear against a workpiece carried in said nest to bindingly retain said workpiece against said shoulder means to releasably retain said workpiece in a fixed operative position in said nest for movement of said workpiece with said cradle and nest about said first axis of rotation for adjusting its angle of tilt with respect to said drill and for movement with said nest about said second axis of rotation for adjusting its angular orientation with respect to the axis of said drill.

3. A drill fixture for adjustably positioning a workpiece with respect to a drill, comprising a supporting structure, a cradle mounted on said supporting structure and rotatable about a first axis of rotation, a generally cylindrically shaped nest carried within said cradle for movement therewith and rotatable with respect to said cradle about a second axis of rotation normal to said first axis of rotation, said nest having a first open end into which a workpiece may be inserted and loosely received, locator means removably mounted on the end of said nest opposite said first end and releasably engageable with said workpiece for moving said workpiece relative to said nest to locate said workpiece in the desired orientation in said nest, and removable means closing said first end of the nest and engaging said workpiece for holding it fixed in the desired orientation in said nest for movement therewith.

4. A drill fixture for adjustably positioning a workpiece with respect to a drill, comprising a supporting structure, a cradle mounted on said supporting structure and rotatable about a first axis of rotation, a generally cylindrically shaped nest carried within said cradle for movement therewith and rotatable with respect to said cradle about a second axis of rotation normal to said first axis of rotation, said nest having a first open end into which a workpiece provided with an axially disposed opening may be inserted and loosely received, locator means removably mounted on the end of said nest opposite said first end and releasably engageable with the opening in said workpiece for moving said workpiece relative to said nest to position said workpiece opening on the axis of said nest, and removable means closing said first end of the nest and engaging said workpiece for holding it in a fixed position in said nest for movement therewith.

5. A drill fixture as set forth in claim 4 in which said locator means comprises a bridge mountable on said nest, and a pin is adjustably carried in said bridge and bindingly receivable in the opening in said workpiece.

6. A drill fixture as set forth in claim 5 with the addition that said bridge extends diametrically across said nest and is provided with a locating pin and mounting screw adjacent each of its ends receivable in openings formed in said nest.

7. A drill fixture as set forth in claim 5 with the addition of a guide block matingly engageable with said workpiece and slidably mounted on said bridge.

8. A drill fixture as set forth in claim 4 in which said locator means comprises a bridge extending across said nest and removably mounted thereon by locating pins and mounting screws receivable in openings formed in said nest, an axially projecting boss on said bridge, a guide block matingly engageable with said workpiece and mounted on said bridge for sliding movement along said boss, and a pin adjustably carried in an opening formed in said bridge and boss and bindingly receivable in the opening in said workpiece.

9. A drill fixture for adjustably positioning a workpiece with respect to a drill, comprising a supporting structure, a cradle mounted on said supporting structure and rotatable about a first axis of rotation, a generally cylindrically shaped nest carried within said cradle for movement therewith and rotatable with respect to said cradle about a second axis of rotation normal to said first axis of rotation, said nest having a first open end into which a workpiece may be inserted and loosely received, locator means mountable on the end of said nest opposite said first end and bindingly engageable with said workpiece for moving said workpiece relative to the nest to position said workpiece in said nest in the desired location with respect to said first and second axes of rotation, and removable means closing said first end of the nest and engaging said workpiece for holding it in a fixed position in said nest for movement therewith.

References Cited in the file of this patent
UNITED STATES PATENTS

| 2,752,802 | Bull et al. | July 3, 1956 |
| 2,861,402 | Okenfuss | Nov. 25, 1958 |
| 2,922,323 | Weidner | Jan. 26, 1960 |

FOREIGN PATENTS

| 782,403 | Great Britain | Sept. 4, 1957 |